Patented Mar. 20, 1934

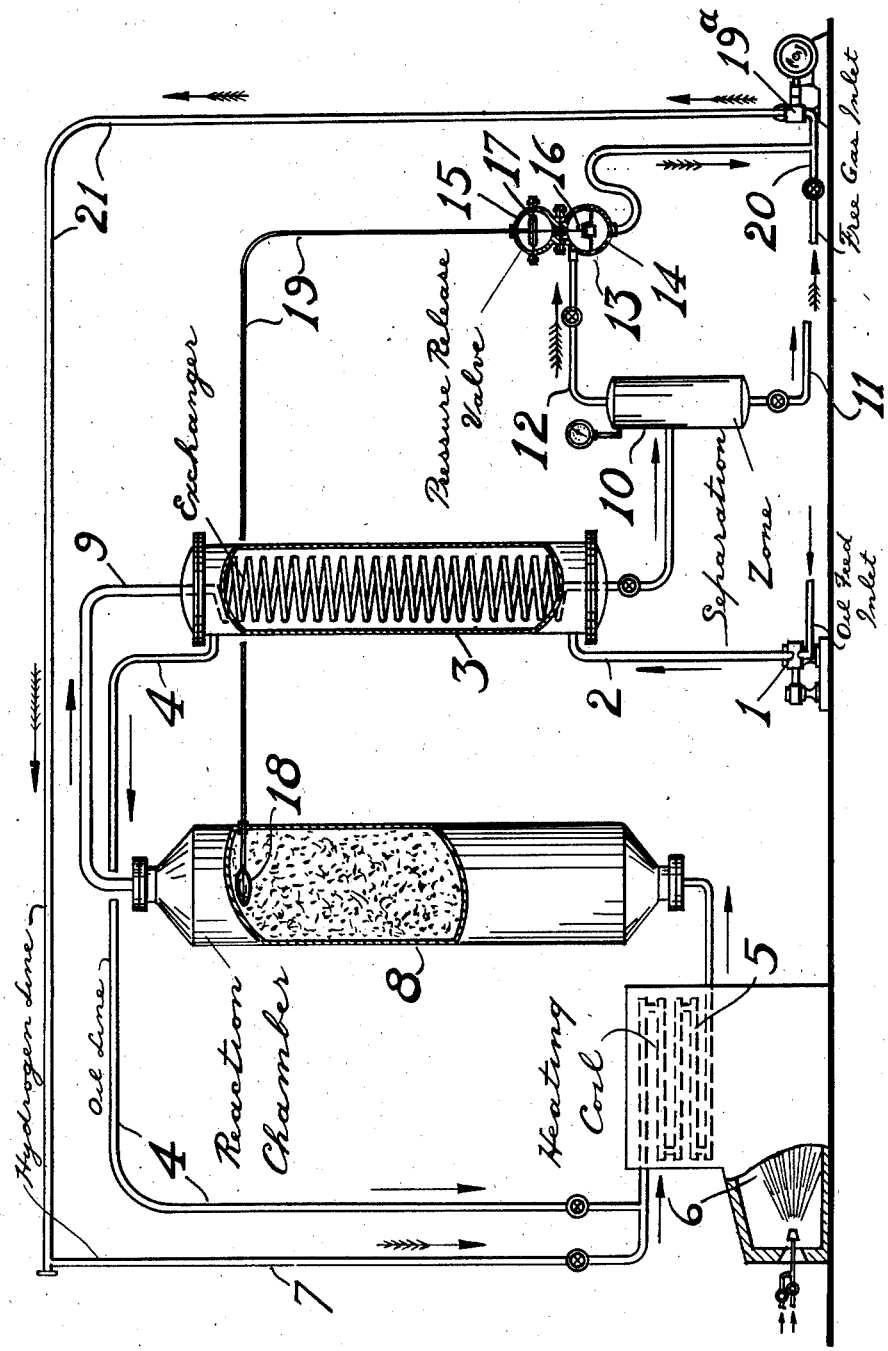

1,951,725

UNITED STATES PATENT OFFICE 1,951,725

METHOD FOR CONTROLLING TEMPERATURE IN HYDROGENATION REACTORS

John Christ, Baton Rouge, La., assignor to Standard-I. G. Company

Application September 26, 1930, Serial No. 484,717

4 Claims. (Cl. 196—53)

The present invention relates to an improved process for the hydrogenation of hydrocarbon oils and relates specifically to a method for controlling temperatures in the reactors used in the process.

In the catalytic hydrogenation of hydrocarbon oils, particularly at temperatures above 900° F. it is found that excessive rises of temperature sometimes occur at points in the catalytic bed. These developments of high temperature are so rapid that when once started they easily go beyond control, making operation of the process not only impossible, but extremely dangerous. I have now found that violent temperature increases of the type described may be quickly brought under control by a lowering of pressure in the catalytic reactor.

The feed stocks which are suitable for my process preferably consist of distillate oils such as gas oil, kerosene, heavy naphtha, and unfinished gasoline and the like. In my preferred form of operation, oil and a gas rich in hydrogen are passed together through one or more reaction drums packed with suitable catalyst where reaction takes place to convert the oil to lower boiling oils of high quality as motor fuel. The oil product is characterized by high anti-detonation qualities, low sulfur, usually below 0.02% and very small content of resinous or gum-forming constituents.

The oil and hydrogen-containing gas are preferably preheated, either separately or in mixture, before introduction into the catalytic reactor. After flowing through the reactor the mixture of gas and oil may be passed through partial condensation means in order to separate out heavier, unconverted fractions in the oil. These fractions may be returned to the reaction drum for retreatment or may be withdrawn from the process for other purposes, or sent to a second hydrogenation stage, if desired. If recycling is employed, from 75 to 95 percent of the feed oil may be converted to motor fuel. The light oil fractions, which comprise motor fuel, and the gas are cooled and passed to a separation drum from which the oil is withdrawn as finished product. If desired the partial condensation step may be omitted and the total oil from the reactor cooled and collected directly.

An excess of hydrogen-rich gas is passed through the reactor with the oil but only in sufficient excess to prevent formation of coke or tarry materials. In general I find that about 1000 to 3000 cubic feet of gas per barrel of oil is sufficient. It will be understood, however, that if I desire to add more hydrogen to the oil I may employ a larger excess, for example, 5000 to 10,000 cubic feet per barrel. It is also preferable to recirculate the gas used in the process. By this means the gas separated from the product is recycled to the reactor after suitable purification, which may comprise any means suitable for removing gaseous hydrocarbons from the gas, such as scrubbing with heavy oils under pressure. Fresh hydrogen may be added continuously to the recycle gas stream to make up for that consumed by the process.

The process is carried out under pressure in excess of 20 atmospheres and preferably above about 100 or 200 atmospheres. The feed rate is governed largely by the products desired and the temperature used, and may vary from about 1.0 to 4.0 or more volumes of oil per volume of reaction drum per hour.

Catalytic materials for use in the reactor may comprise the oxides and/or sulfides of chromium, molybdenum or tungsten, or other compounds or mixtures of these materials with other materials, for example alkaline earth compounds, rare earths, zinc oxide or alumina. The catalyst may be packed in the drum in lump form or supported upon any suitable carrier.

The temperature of operation is determined largely by the nature of the feed stock and that of the product desired as will be understood by one skilled in the art. In general temperatures above 900° F. and ordinarily in the range between about 930 to 1030° F. are preferably employed in the catalytic reactor. As mentioned it has been found that excessive temperatures are often developed throughout or at points in the catalytic bed in the reactor, when operating in the above range. These temperature rises develop suddenly, apparently at points where the exothermic heat of the hydrogenation reaction promoted by contact of the catalyst is not conducted away rapidly enough. This often occurs when, owing to faulty temperature regulation, the temperature in the reactor is increased to above the optimum point for the rates of flow used. In many cases the development of heat is so rapid that the temperature in certain points of the reactor may go beyond control and rise to 1500 or even 2000° F. Not only is such an action highly dangerous and detrimental to the apparatus, but the operating equilibria of the process are completely upset. Furthermore these local developments of high temperature form coke within the catalyst which reduces its activity and impedes the flow therethrough.

I have now found that these violent rises of temperature may be halted by a temporary partial lowering of the pressure in the catalytic reactor. In this way the mounting temperature is quickly arrested and operation may be continued at the lower pressure to produce substantially the same product as before. When the pressure is reduced for this purpose, it is often advantageous to lower the temperature of the materials entering the reactor at the same time, for example where a temperature rise was precipitated by heating the inlet materials beyond the optimum point for the rates of flow employed. After the temperature has been stabilized, the pressure may be again raised, preferably slowly, and operation continued as before.

My method takes effect substantially as soon as applied, which is of great importance inasmuch as the undesired temperature rises take place with great rapidity when once started. Furthermore, reduction of pressure according to my method does not substantially disturb the normal operating equilibrium of process for more than a few minutes.

The degree to which the pressure is lowered depends largely upon the conditions of temperature and pressure employed, for example, when operating at 200 atmospheres the pressure may be reduced to about 175 atmospheres. If the temperature continues to rise a further reduction may be made to about 135 atmospheres or below. At other pressures of operation the reduction may be carried out proportionately. The pressure is ordinarily reduced as rapidly as is possible without injury to the equipment and may be carried out in any suitable way, for example, by releasing oil or preferably gas from the process. It will be understood that the amount which the pressure is lowered depends largely upon the extent to which the temperature has increased when the pressure is reduced, and also upon the rapidity with which the rise is taking place. If desired, my method may be carried out automatically by any suitable means. For example, a pressure release valve controlled by a pyrometer placed in the reactor may be connected to the apparatus in such a way that gas is released from the process when the reactor temperature exceeds a predetermined value, again closing when the release of pressure has brought the temperature below that point.

In the attached drawing is shown diagrammatically an apparatus for destructive hydrogenation of mineral oils adapted to be controlled according to the present invention. Reference character 1 denotes an oil feed pump which forces the oil through line 2, exchanger 3 and line 4, then through the heater 5, which is arranged in a furnace setting 6. Free hydrogen is added by a pipe 7 connected with the inlet of the heater 5.

The mixture of oil and hydrogen is forced into the reaction chamber 8 which may be filled with the hydrogenating catalyst of the type disclosed above. The reaction products flow from the reaction chamber by pipe 9 through an exchanger 3 and into a separation zone 10. From this zone the liquid products may be withdrawn to a storage pipe 11.

The gaseous products leave the separation zone 10 through a pipe 12, which is fitted with an automatic pressure release valve 13. Various forms of such valves are known, but the one disclosed in the drawing shows a globe 14, yoke 15, and a plunger 16, which is actuated by a diaphragm 17. This pressure diaphragm is connected with a bulb 18 placed within the reaction chamber 8 and filled with an expansible material which may be either liquid or gaseous, as is well known. Pressure within the bulb is proportional to the temperature within the drum, and the pressure is communicated to the diaphragm 17 by line 19 so that the valve 13 is opened in proportion to the temperature rise and is closed as its drops.

The gas, after passing through the valve 13, may be purified by known methods and is recompressed by booster 19. Free gas may be admitted by line 20. The recompressed gas is fed to line 7 by means of a recirculator pipe 21.

As indicated above, other forms of automatic valves may be used but the valve opening is always to be controlled by temperature within the drum. Electrically operated valves may be used in any of the well known forms.

My invention is not to be limited by any theory of the mechanism of the reactions nor to any specific example which may have been given for purpose of illustration, but only by the following claims in which I wish to claim all novelty inherent in my invention.

I claim:

1. In the hydrogenation of hydrocarbon oils at high temperature and under high pressure, the method of preventing a sudden rise in temperature in the reacting mass which comprises rapidly and substantially reducing the pressure in the reaction zone to a point below the predetermined operating level at the instant of sudden temperature rise, the pressure being reduced substantially in proportion to the rise in temperature and immediately thereafter gradually increasing the pressure to the predetermined operating level.

2. In the hydrogenation of carbonaceous material at high temperature and under a predetermined pressure in excess of 20 atmospheres, the method of preventing a sudden and excessive rise of temperature in the reaction zone which comprises temporarily, rapidly and substantially reducing the pressure within the reaction zone below the normal operating level but not below 20 atmospheres, the pressure reduction being substantially proportional in rate and amount to the temperature rise, whereby the temperature is rapidly reduced, then gradually rebuilding pressure to the predetermined operating level.

3. Process according to claim 2 in which the reacting materials are maintained under a normal operating pressure of about 200 atmospheres and pressure is temporarily rapidly reduced to between 135 and 175 atmospheres at the instant when a sudden rise in temperature occurs.

4. Process according to claim 2, in which the normal operating pressure is in excess of 100 atmospheres.

JOHN CHRIST.